United States Patent [19]

Grey et al.

[11] Patent Number: 4,944,346
[45] Date of Patent: Jul. 31, 1990

[54] ETHER SULFOXIDE COMPOUNDS FOR ENHANCED OIL RECOVERY

[75] Inventors: Roger A. Grey; Lawrence J. Karas, both of West Chester, Pa.; Linda A. Verkruyse, Plano, Tex.

[73] Assignee: Atlantic Richfield Company, Los Angeles, Calif.

[21] Appl. No.: 448,388

[22] Filed: Dec. 11, 1989

[51] Int. Cl.$^5$ .............................. E21B 43/22
[52] U.S. Cl. .................... 166/274; 166/275; 252/8.554
[58] Field of Search ............ 166/273, 274, 275, 305.1; 252/8.554

[56] References Cited

U.S. PATENT DOCUMENTS

| | | | |
|---|---|---|---|
| 4,166,038 | 8/1979 | Stournas | 252/8.554 |
| 4,293,428 | 10/1981 | Gale et al. | 252/8.554 |
| 4,465,602 | 8/1984 | McCoy | 252/8.554 |
| 4,476,929 | 10/1984 | Stapp | 252/8.554 X |
| 4,485,872 | 12/1984 | Stapp | 166/273 |
| 4,533,478 | 8/1985 | Fields | 166/275 X |
| 4,540,527 | 9/1985 | Fields | 252/8.551 X |
| 4,555,350 | 11/1985 | Fields | 166/275 X |

FOREIGN PATENT DOCUMENTS 2156406 10/1985 United Kingdom .

*Primary Examiner*—George A. Suchfield
*Attorney, Agent, or Firm*—F. Lindsey Scott

[57] ABSTRACT

A process for recovering crude oil from a subterranean formation comprising injecting into the formation a liquid composition consisting essentially of a specific surfactant in an aqueous medium, driving the liquid composition through said formation to displace oil from said formation and recovering said oil in a production well. The surfactant has the general formula

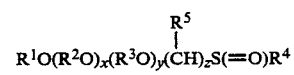

wherein $R^1 = C_1$-$C_{30}$ alkyl or alkylaryl, $R^2 = C_2H_4$ or $C_3H_6$, $R^3 = C_2H_4$ or $C_3H_6$, $R^4 = C_1$ to $C_{12}$ alkyl or alkylaryl, $R^5 = H$ or $C_1$-$C_{12}$ alkyl or alkylaryl, x and y are integers from 0 to 100, and z is an integer from 1 to 4.

7 Claims, No Drawings

ETHER SULFOXIDE COMPOUNDS FOR ENHANCED OIL RECOVERY

BACKGROUND OF THE INVENTION

This invention relates to an improved process for the recovery of oil from subterranean oil bearing formations which may also contain highly saline and/or hard water, e.g. water containing appreciable quantities of sodium chloride and/or water soluble salts of divalent cations such as calcium or magnesium.

The petroleum industry has long recognized that a large portion of the original oil in place in many oil-bearing subterranean formations remains in place after so-called primary oil recovery by the natural pressures of the reservoir. Waterflooding, secondary oil recovery, is routinely used to supplement the oil recovery and increase the amount of oil produced from a reservoir. Frequently, even after secondary oil recovery processes, over one-half of the oil originally present remains trapped in the formation. The addition of chemicals called surfactants to the water flooding process has been proposed as a tertiary oil recovery method to recover additional oil from the formation. Surfactants, when added to the waterflood, lower the interfacial tension between oil and water and mobilize the oil for displacement to the production well. As oil reserves dwindle and exploration for new discoveries becomes more difficult and costly, the use of improved tertiary recovery methods on previously discovered resources will play an increasingly important role in the overall production of crude oil.

Three characteristics of reservoirs, temperature, total dissolved solids (salinity), and oil type can be considerably different in each reservoir. It is known that the ability of surfactants to lower interfacial tensions and thus recover oil are very dependent on these parameters. The effectiveness of a surfactant in a given reservoir is related to its chemical structure and therefore many surfactants have been proposed for tertiary oil recovery applications.

U.S. Pat. No. 4,293,428 discloses the use of a waterflooding technique with surfactants chosen from sulfates, sulfonates, phosphates, or carboxylates to control interfacial tension.

U.S. Pat. No. 4,465,602 discloses a chemical flooding process using an alkylarylpolyalkoxyalkylene sulfonate alone or in combination with a water-soluble petroleum sulfonate as surfactants to control interfacial tension in high salinity environments.

British Pat. No. 2,156,406 discloses the use of surfactant concentrates comprising a low molecular weight sulfonate, two different alkyl aromatic alkoxy alkylene sulfonates and a carrier.

One of the major problems encountered by many surfactants is their loss of effectiveness in high salinity environments. Thus new surfactants are constantly being sought which can be effective in a range of salinity conditions.

SUMMARY OF THE INVENTION

An improved process for recovering crude oil from a subterranean formation comprises injecting an aqueous surfactant solution into the subterranean formation along with a suitable displacing fluid and producing oil from production wells in the formation. The suitable displacing fluid may be water or a saline solution or an aqueous medium containing a soluble polymer. The mobility of the drive fluid is controlled by the use of a linear or branched alkyl alkoxy surfactant terminated with a sulfoxide. These surfactants have been found to effectively lower interfacial tensions between water and oil at high salinities.

DETAILED DESCRIPTION OF THE INVENTION

A process has been discovered for recovering crude oil from a subterranean formation having at least one injection means in fluid communication with at least one production means comprising:

(a) injecting into said formation a liquid composition consisting essentially of at least one surfactant selected from surfactants having a formula

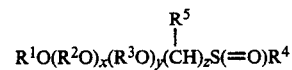

wherein $R^1 = C_1-C_{30}$ alkyl or alkylaryl, $R^2 = C_2H_4$ or $C_3H_6$, $R^3 = C_2H_4$ or $C_3H_6$, $R^4 = C_1$ to $C_{12}$ alkyl or alkylaryl, $R^5 = H$ or $C_1$ to $C_{12}$ alkyl or alkylaryl, x and y are integers from 0 to 100, and z is an integer from 1 to 4;

(b) driving said liquid composition through said formation to displace oil from said formation toward said production means; and (c) recovering crude oil from said formation through said production means.

The suitable surfactant is selected from surfactants having a formula

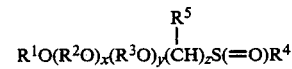

wherein $R^1 = C_1-C_{30}$ alkyl or alkylaryl, $R^2 = C_2H_4$ or $C_3H_6$, $R^3 = C_2H_4$ or $C_3H_6$, $R^4 = C_1$ to $C_{12}$ alkyl or alkylaryl, $R^5 = H$ or $C_1$ to $C_{12}$ alkyl or alkylaryl, x and y are integers from 0 to 100, and z is an integer from 1 to 4.

The preferred method of preparation of the surfactant is by preparation of an alkoxylated alcohol, reaction thereof with a sulfoxide to form a sulfide, followed by oxidation of the sulfide to a sulfoxide.

The concentration of surfactant useful in the present process is in the range of about 0.10 to about 5.0 percent, on a weight basis, of surfactant per total liquid composition.

The surfactant may be injected into the formation as a separate stream and/or combined with the aqueous medium. To provide for ease of injection and for improved control of surfactant concentration in the formation, it is preferred that the surfactant be combined with the aqueous medium prior to injection. The surfactants also have special applicability in microemulsions. The expression microemulsion as used herein is defined as a stable, transparent or translucent micellar solution of oil, water, and surfactant. These microemulsions may be water-external, oil-external, or may not have any identifiable external phase. An effective microemulsion for an oil recovery process must sufficiently displace oil, and in turn the microemulsion must be effectively displaced by any water which drives it through the formation.

The liquid composition is preferably injected into the formation in slugs, more preferably as slugs with a surfactant concentration in excess of its critical micelle concentration. The relative amounts of liquid composition and aqueous drive fluid injected into the formation may vary and, preferably, the liquid composition is injected into the formation in amounts similar to the minimum amount of micellar fluids typically injected in a micellar/polymer flooding type process wherein the surfactant is present in the liquid composition in a range of about 1% to 10% of the total on a weight basis. The size of the individual slugs of liquid composition injected in accordance with the present invention is dependent on the number of slugs injected and preferably range up to about 10%, more preferably up to about 5%, of the formation or reservoir pore volume. The total amount of liquid composition injected should be about 25% of the formation pore volume (including the pore volume occupied by recoverable hydrocarbons). The amount of aqueous drive fluid is such as to urge or push the liquid composition toward the production means, e.g., production well or wells. The amount of aqueous drive medium injected per injection is also dependent on the number of injection steps and may range up to about 100% or more of the formation or reservoir pore volume, based on the volume of the aqueous drive fluid at the conditions present in the formation. The rate of water injection into the formation is preferably such that the liquid composition sweeps or moves through the formation at a substantially constant rate.

The instant invention is used primarily in formations having high salinity. The salinity should vary between 6% and 22% inorganic salts.

The following examples are meant to illustrate, but not limit the invention.

EXAMPLE I

(a) Preparation of 12-n-pentyl-4,7,10-trioxa-2-thianonadecane:

In a single neck, 1 liter, round bottom flask, fitted with a magnetic stirrer and a gas inlet, was placed 25.0 g (83 mmol) of 9-pentyl-4,7-dioxahexadecan-1-ol. Under an inert atmosphere of Argon a solution was made by the addition of 125 ml of dimethyl sulfoxide, 75 ml of acetic anhydride, and 25 ml of glacial acetic acid. The resultant yellowish solution was allowed to stir at room temperature for 5 days.

The product solution was poured into a 2 liter Erlenmeyer flask. Excess acetic anhydride was quenched via the addition of 35 ml of methanol. Hexane was added to make the resultant solution approximately 10 wt.-% with respect to the expected amount of product. The resultant solution was neutralized by the addition of 500 ml of a 2,0M solution of sodium hydroxide. The resultant mixture was allowed to stir at room temperature overnight.

The hexane solution was isolated in a 2 liter separatory funnel and washed 5× with water, once with a saturated brine solution and dried over anhydrous magnesium sulfate. Removal of the solvents under reduced pressure afforded 30g (100% yield) of a yellow oil. HPLC analysis indicated that the product consisted of two major substances. Namely, the desired methyl thio methyl ether and the corresponding ethoxy acetate (structure assignment via IR) in a 85:15 ratio, respectively. This mixture could be effectively separated via silica gel column chromatography using 10% ethyl acetate-hexane as eluant.

The product mixture was purified to give 23.0g (80% purified yield) of the methyl thiomethyl ether. Elemental analysis showed the following:

|       | % Carbon | % Hydrogen | % Sulfur |
|-------|----------|------------|----------|
| Cald. | 66.2     | 11.7       | 8.8      |
| Found | 64.6     | 11.3       | 8.6      |

EXAMPLE II

Preparation of 12-n-pentyl-4,7,10-trioxa-2-thiaoxidenonadecane

In a 250 ml, 3 neck, round bottom flask, fitted with a magnetic stirring bar, gas inlet and glass stoppers was placed 24.0 g (66.2 mmol) of the methyl thiomethyl ether from Example I. Under an inert atmosphere of Argon a solution was made via the addition of 100 ml of methanol. The oxidant, 16.0 g (75 mmol) of sodium periodate (freshly powdered) was then introduced, all at once, at 0° C. The resultant mixture was allowed to equilibrate to room temperature and stir overnight. The following morning TLC analysis indicated that the conversion of sulfide was complete. Therefore, excess sodium periodate was removed via filtration using Celite. The methanol was removed under reduced pressure to afford an oil. This material was dissolved in hexane, washed three times with water, once with a saturated brine solution, and dried over anhydrous magnesium sulfate. Removal of the solvents under reduced pressure afforded 24g (100% yield) of a viscous oil. HPLC analysis indicated that conversion of sulfide was approximately 99% with an equal selectivity to sulfoxide.

Purification and separation of the product material was accomplished via silica gel-column chromatography using 10% ethyl acetate-chloroform as eluant. Using this method 23 g (96% purified yield) of the desired sulfoxide was obtained. Elemental analysis resulted in the following:

|        | % Carbon | % Hydrogen | % Sulfur |
|--------|----------|------------|----------|
| Calcd. | 63.4     | 11.2       | 8.5      |
| Found  | 62.9     | 11.2       | 7.4      |

EXAMPLE III

To illustrate the evaluation of the sulfoxide surfactants, the following procedure was followed:

All of the phase behavior was done by preparing salinity scans. Salinity scan samples were prepared by adding a constant weight of surfactant to equal weights of oil and brine in tubes for a series of samples. Only the salinity of the brine used to make the samples varies from tube to tube.

Phase behavior results are described in terms of optimal salinities and solubilization parameters. Optimal salinity and solubilization parameter are used as a point of reference to compare surfactants.

Optimal salinities and solubilization parameters were calculated from analyses of microemulsion phases. Oil and brine solubilization parameters are defined as:

$$\frac{X_{oil}}{X_{surf}} \quad \text{or} \quad \frac{X_{brine}}{X_{surf}}$$

respectively, where $X_{oil}$, $X_{brine}$, and $X_{surf}$ are equal to the weight fraction of oil, brine, and surfactant respectively in the microemulsion phase. At optimal salinity the oil and brine solubilization parameters are equal. Optimal salinity is defined as the salinity of the brine used to make the sample which results in equal oil and brine solubilization parameters. The results of the tests are shown in Table I where Surfactant A was 1—$C_{12}H_{25}(OCH_2CH_2)_5OCH_2S(=O)CH_3$, and surfactant B was 1—$C_{12}H_{25}(OCH_2CH_2)_5OH$. n-Octane was used as the oil.

TABLE I

| Surfactant | Solubilization parameter | (% NaCl) Optimal Salinity | Temperature | Oil Phase Surf. Conc. @ Optimum |
|---|---|---|---|---|
| A | 9.8 | 11.55 | 60° C. | 0.44 wt % |
| B | 8.5 | 0.0 | 33° C. | 1.51 wt % |

The sulfoxide surfactant A is shown to have superior properties to those of the comparison alcohol surfactant B. The solubilization parameter of 9.8 indicates greater ability to lower interfacial tension of the oil-water microemulsions. The optimal salinity indicates greater tolerance to the high salinity of many subterranean formations. So too, the sulfoxide surfactants are shown to have more resistance to solution in the oil phase than many other nonionic surfactant types. Since the solubilization parameters, salinity tolerance, and oil phase surfactant concentration of surfactants vary with temperature, it has been found that at 33° C. surfactant A has a solubilization parameter of 12, an optimum salinity of 17% NaCl, and an oil phase surfactant concentration of 0.3 wt-%.

We claim:

1. A process for recovering crude oil under high salinity conditions from a subterranean formation having at least one injection means in fluid communication with at least one production means comprising:
   (a) injecting into said formation a liquid composition consisting essentially of at least one surfactant selected from surfactants having a formula $$R^1O(R^2O)_x(R^3O)_y(\overset{R^5}{\underset{|}{CH}})_zS(=O)R^4$$

wherein $R^1=C_1-C_{30}$ alkyl or alkylaryl, $R^2=C_2H_4$ or $C_3H_6$, $R^3=C_2H_4$ or $C_3H_6$, $R^4=C_1$ to $C_{12}$ alkyl or alkylaryl, $R^5=H$ or $C_1$ to $C_{12}$ alkyl or alkylaryl, x and y are integers from 0 to 100, and z is an integer from 1 to 4;
   (b) driving said liquid composition through said formation with a driving fluid to displace oil from said formation toward said production means; and
   (c) recovering crude oil from said formation through said production means.

2. The process of claim 1 wherein said driving fluid is selected from the group consisting of water, saline solution, polymer solution, and mixtures thereof.

3. The process of claim 1 wherein the surfactant is a linear or branched alkyl ethoxy propoxy alkyl sulfoxide.

4. The process of claim 1 wherein said surfactant is a linear or branched alkyl ethoxy alkyl sulfoxide.

5. The process of claim 1 wherein said surfactant is

1—$C_{12}H_{25}(OCH_2CH_2)_5OCH_2S(=O)CH_3$

6. The process of claim 1 wherein the values of $R^1$, $R^2$, $R^3$, $R^4$, $R^5$, x, y, and z are chosen by optimizing the oil recovery properties of the surfactant with the temperature, salinity and oil of a given reservoir.

7. A process of claim 1 in which the effective salinity is between 6 and 22% inorganic salts.

* * * * *